(No Model.)
W. A. LYON & W. E. SPROUL.
CAR AXLE.
No. 449,684. Patented Apr. 7, 1891.
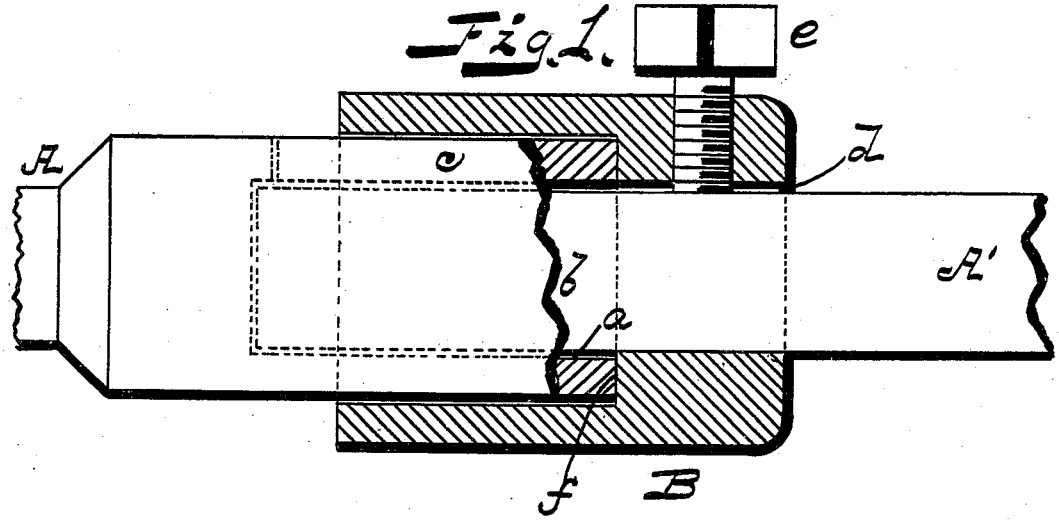
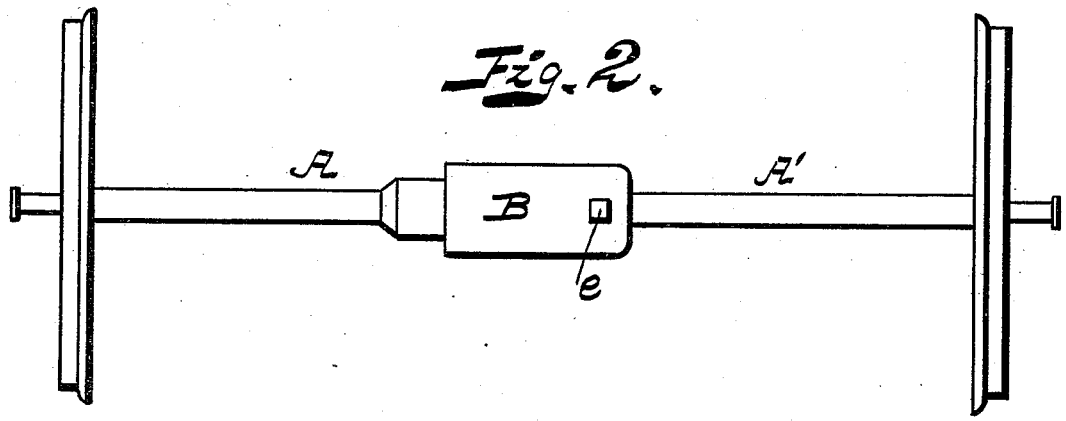
WITNESSES.
Jas. B. Clarke
M. M. Mason
INVENTORS.
W. A. Lyon
W. E. Sproul
by E. H. Bates, Attorney.
THE NORRIS PETERS CO., PHOTO-LITHO., WASHINGTON, D. C.

UNITED STATES PATENT OFFICE.

WILLIAM A. LYON AND WILLIAM E. SPROUL, OF DANBURY, CONNECTICUT.

CAR-AXLE.

SPECIFICATION forming part of Letters Patent No. 449,684, dated April 7, 1891.

Application filed October 17, 1890. Serial No. 368,437. (No model.)

*To all whom it may concern:*

Be it known that we, WILLIAM A. LYON and WILLIAM E. SPROUL, citizens of the United States, residing at Danbury, in the county of Fairfield and State of Connecticut, have invented certain new and useful Improvements in Car and other Axles; and we do hereby declare the following to be a full, clear, and exact description of the invention, such as will enable others skilled in the art to which it appertains to make and use the same.

This invention relates to improvements in car and other axles for vehicles; and it consists in the novel construction and arrangement of the same, whereby the wheels of the same are caused to revolve independent of one another in rounding curves as well as on a straight road, and at the same time the joint about midway of the axle is protected from dirt, cinders, and the like by a hood which completely covers said axle at said joint, all as will be hereinafter fully explained, and particularly pointed out in the appended claim.

The annexed drawings, to which reference is made, fully illustrate our invention, in which—

Figure 1 represents a vertical longitudinal view of our improved axle, and Fig. 2 is a side view of our device.

Referring by letter to the accompanying drawings, A and A' designate a car or other axle composed of two parts or sections, which is divided about the center thereof. The section A is provided with an opening $a$, forming a socket, and which section we denominate the "female section." The section A', or male section, is provided with an extension $b$, which enters the socket in the opposite section and forms a loose joint between said sections. This male section is provided with a detachable hood or protector for the joint. This hood B provides a detachable socket or recess for the extended end $c$ of the female section, thus producing an indirect passage between the male and female joint or coupling, which, by means of the hood or cover, excludes all dust or dirt, cinders and the like from the coupling.

In the annexed drawings we show our device, wherein we provide the axle or joint thereof with a hood that is detachable therefrom and does not form a part of the axle. This hood is passed upon the axle through a central perforation $d$, and said hood is secured in place by a screw $e$, which can be loosened and the hood moved to or from the female section, thus providing means whereby the joint may be closed at the meeting ends of the two sections and providing a tight joint between the extreme end $f$ of the section A and the interior face of the hood B, and by such adjustment of the hood the wear on said end of said section can be taken up and a tight joint readily obtained. At the same time said hood, if worn or broken, can be readily replaced with another hood simply by loosening the screw $e$ and passing the hood over the end of the axle A'. It will thus be seen that we provide means whereby a sectional axle can be manufactured and used without collecting dirt, cinders, and the like between the joint or meeting ends of the two sections and at the same time the wheels thereof act independently of one another, and it is durable and cheap to manufacture.

We are aware that prior to our invention sectional axles have been joined together and held in place by movable sleeves, as shown in the patent numbered 98,681. Hence we do not claim such a device, broadly; but,

Having thus described our invention, what we claim, and desire to secure by Letters Patent, is—

Combined with the socket $c$, formed integral with the section A, the hood B, having opening $d$ and screw $e$, and the section A', all as shown and described.

In testimony whereof we affix our signatures in presence of two witnesses.

WILLIAM A. LYON.
WILLIAM E. SPROUL.

Witnesses:
FRANK DAVIS,
HENRY H. NICHOLS.